United States Patent [19]
Mizuno et al.

[11] 3,889,583
[45] June 17, 1975

[54] CASHEW UNSHELLING APPARATUS

[75] Inventors: Nobuhiko Mizuno, Tokyo; Hideo Wakai, Fujimi, both of Japan

[73] Assignee: Cashew Company, Ltd., Tokyo, Japan

[22] Filed: July 9, 1973

[21] Appl. No.: 377,583

[30] Foreign Application Priority Data
Mar. 26, 1973 Japan.............................. 48-33489

[52] U.S. Cl.................................... 99/576; 99/579
[51] Int. Cl............................................... A23n 5/00
[58] Field of Search.......................... 99/567–569, 99/572–577, 581–583, 579

[56] References Cited
UNITED STATES PATENTS

| | | | |
|---|---|---|---|
| 442,657 | 12/1890 | Woodside | 99/576 |
| 1,474,468 | 11/1923 | Fogarty | 99/577 X |
| 2,764,198 | 9/1956 | Porem | 99/582 X |
| 3,774,526 | 11/1973 | Nemir | 99/577 X |

FOREIGN PATENTS OR APPLICATIONS

| | | | |
|---|---|---|---|
| 4,537,836 | 11/1970 | Japan | 99/568 |

*Primary Examiner*—John W. Huckert
*Assistant Examiner*—Stuart S. Levy
*Attorney, Agent, or Firm*—Wenderoth, Lind & Ponack

[57] ABSTRACT

A cashew unshelling apparatus is disclosed. It includes a horizontal elongate guide member having a groove of triangular cross-section formed longitudinally in the upper surface thereof and a slit formed at substantially the center of the length thereof along the bottom of said triangular groove, and upper and lower frames arranged vertically in two stages above said slit. A cutting blade supporting member is vertically movably mounted on said lower frame with the lower portion thereof suspended from said lower frame to a level immediately above said slit. A spring is interposed between the upper portion of said cutting blade supporting member and said upper frame for urging said supporting member downwardly, while a lower rotary cutting blade is connected to a spindle arranged immediately below said slit and extending at right angles to said guide member, the cutting edge of said lower rotary cutting blade moving into and out of said slit during rotation of said spindle. A Y-shaped upper cutting blade is connected to the lower end face of said supporting member in parallel to said guide member and with the Y-shaped bifurcated portion thereof extending down-stream with respect to the moving direction of cashews. Pusher members are connected to a chain at a large interval and carried thereby for feeding cashews to a position between said upper and lower cutting blades which cashews are placed in said triangular groove with the convexed backs upside. Driving chain wheels for driving said chain, are also provided said chain and said driving chain wheels constituting a guide mechanism for advancing said pusher members along the triangular groove, and means are provided for synchronizing the time when each of said pusher members reaches said slit and the time when said lower rotary cutting blade protrudes from said slit.

1 Claim, 14 Drawing Figures

CASHEW UNSHELLING APPARATUS

BACKGROUND OF THE INVENTION

1. Field of the Invention

This invention relates to an apparatus for unshelling cashew nuts.

2. Description of the Prior Art

The handling and automatic unshelling of cashew nuts is cumbersome because of the hard outer shell and unique shape thereof, but this has been made possible by the unshelling apparatus previously proposed by the present inventor (see Japanese Utility Model Publication NO. 18054/70), which will be described hereunder: Cashew nuts have an anomolous shape as shown in FIG. 1(A) of the accompanying drawings, and the apparatus is used for unshelling cashew nuts of such shape. In the apparatus, a cut $a$ is formed in the outer surface of the shell in the manner shown in FIG. 1(B) and then the shell is cracked into two halves as shown in FIG. 1(C) by urging the shell strongly against a wedge at the cut $a$. A mechanism of the apparatus by which the groove $a$ is first formed is shown in FIG. 2. This part of the apparatus comprises cashew holding members $b_1$, $b_2$ which are respectively movable in the directions of the arrows $X_1$, $X_2$ and rotatable about their own axes, a sleeve $c$ which, only when rotated in the direction of the arrow Y, rotates the holding member $b_1$ in the same direction through ratchet means (not shown), a rack member $d$ which reciprocates in the directions of the arrows $Z_1$, $Z_2$ to rotate the sleeve $c$, and elevating means $f$ for elevating a serrated cutter $e$, the arrangement being such that when a cashew carried on feeding means (not shown) in the posture shown in FIG. 1(A) is placed between the holding members $b_1$, $b_2$, said holding members $b_1$, $b_2$ move toward each other to hold the cashew therebetween and then the rotating serrated cutter $e$ is elevated into contact with the cashew, and thereafter the rack member $d$ moves in the direction $Z_1$ rotating the sleeve $c$, the holding members $b_1 b_2$ and the cashew, whereby the cut $a$ is formed in the outer shell of the cashew by the rotating serrated cutter $e$. A mechanism for dividing the outer shell of the cashew into two halves along the cut $a$ is shown in FIG. 3. This part of the apparatus comprises conveyor means $i$ having a cashew supporting arm $g$ and two cutter blades $h$, $h$ which are normally closed. A lever $j$ is provided with a roller for holding an upward movement of the conveyor means $i$ when said conveyor means moves forward, and a wedge $k$ is provided for forcibly opening the cutter blades $h$, $h$. The arrangement is such that when the cut $a$ is formed in the cashew shell in the manner described above, the conveyor means $i$ advances to the position indicated by the dotted line in FIG. 3 between the holding members $b_1$, $b_2$, with the cutter blades $h$, $h$ disposed in the cut $a$ on the upper side of the cashew shell and the arm $g$ disposed immediately below the cashew, and then the holding members $b_1$, $b_2$ move away from each other, whereupon the conveyor means $i$ advances between said holding members toward the wedge $k$, so that said wedge $k$ is relatively forced between the cutter blades $h$, $h$ to forcibly open said cutter blades, whereby the cashew shell is divided into two halves along the cut $a$.

With such construction, the apparatus is capable of automatically unshelling shells of high hardness and anomalous shapes, but on the other hand, has the disadvantage that the unshelling operation is time-consuming and inefficient, since the wedging step takes place only after the cutting of the cut $a$ is completed. The apparatus has the additional disadvantages that it is complicated in construction and costly and that it is liable to malfunction. Thus, the prior art unshelling apparatus is not necessarily satisfactory as this type of apparatus.

SUMMARY OF THE INVENTION

The present invention has been achieved with a view to overcoming the above-described disadvantages of the prior art apparatus. Namely, the invention consists in a cashew unshelling apparatus comprising a horizontal elongate guide member having a longitudinal groove of triangular section formed in the upper surface and a longitudinal slit formed substantially centrally of the length of the guide member along the bottom of said triangular longitudinal groove in communication therewith, upper and lower frames arranged vertically in two stages above said slit. A cutter support is vertically movably mounted on said lower frame with the lower portion thereof suspending immediately above said slit, with a spring interposed between the upper portion of said cutter support and said upper frame and urging said cutter support downwardly. A lower rotary cutter blade is arranged immediately below said slit and mounted on a spindle extending at right angles to said guide member so that when said spindle rotates, said cutting blade moves into and out of said slit. A Y-shaped upper butting blade is connected to the lower end face of said cutter support in parallel to said guide member and pusher members are connected to a chain at a large interval in the form of comb teeth for feeding cashews placed in said triangular groove with the round backs upside to a position between said upper and lower cutting blades one after another, said Y-shaped upper cutting blade being connected to said cutter support with the Y-shaped bifurcated end portion thereof extending from the other end downstream with respect to the moving direction of said pusher members. Driving sprockets are provided for driving said chain, said chain and said driving sprockets constituting conductor means for advancing said pusher members along the triangular groove. Means are provided for synchronizing the time when each of said pusher members reaches said slit with the time when the lower rotary cutting blade protrudes from said slit. The object of the invention is to provide an improved unshelling apparatus which is capable of rapid unshelling, simple in construction, inexpensive and free of malfunction.

The apparatus of the invention having the construction described above operates in the following manner: Each of the cashews placed in the triangular groove of the guide member with the round back upside is conveyed to the position of the upper and lower cutting blades while being pushed by the pusher member. The Y-shaped upper cutting blade is connected to the lower end face of the cutter support and extending right above the triangular groove, so that a cut is formed in the round back of the cashew by the edge of the cutting blade when said cashew passes below said cutting blade in engagement therewith. In this case, the cashew moves the cutter support slightly upwardly against the biasing force of the spring, so that the cut is formed positively under the weight of the cutter support and the biasing force of the spring exerted on the cashew.

The cashew is conveyed continuously by the pusher member and reaches the position of the elongate slit formed in the guide member. In this case, the rotating lower cutting blades projects from the slit, so that the cashew is contacted by said lower cutting blade at the portion indicated by *l* in FIG. 1(A), which is a relatively hard and fragile portion of the cashew shell, and thus a cut is also formed at this portion of the shell. This cut is also formed positively as the cashew is urged downwardly by the cutter support and spring. The pusher member continuously pushes the cashew and the cashew moves forward, with the upper cutting blade penetrating in the cut formed in the upper side thereof. Since the rear end of the upper cutting blade is bifurcated in the shape of a Y, the bifurcated portion of the upper cutting blade is relatively wedged in said upper cut. In this case, the cashew is held steady by the cutter support and spring and has the cut formed on the underside thereof, so that the shell of the cashew is divided into two halves. The two halves of the divided shell and the cashew nut fall downwardly of the apparatus to be collected separately.

The apparatus of the invention in which the cashew is conveyed constantly by the pusher member throughout the unshelling operation as described above, has the remarkable advantage that unshelling can be achieved rapidly. It also has the advantage that unshelling can be achieved smoothly, because the bifurcated portion of the Y-shaped cutting blade engages the cashew after cuts have been formed in the upper and lower sides of the shell and in this case the cashew is held steady by the cutter support and spring. A further advantage of the apparatus is that, since the apparatus is composed only of the support unit including the upper and lower frames, the spring and the upper cutting blade; the guide member having the triangular groove and the slit, and the spindle having the lower cutting blade, it is simple in construction and can be provided at a low cost. Thus, the apparatus of the invention is highly adapted for use in the unshelling of cashew whose shell is hard and anomalous in shape.

DESCRIPTION OF THE PREFERRED EMBODIMENT

Figure 4:
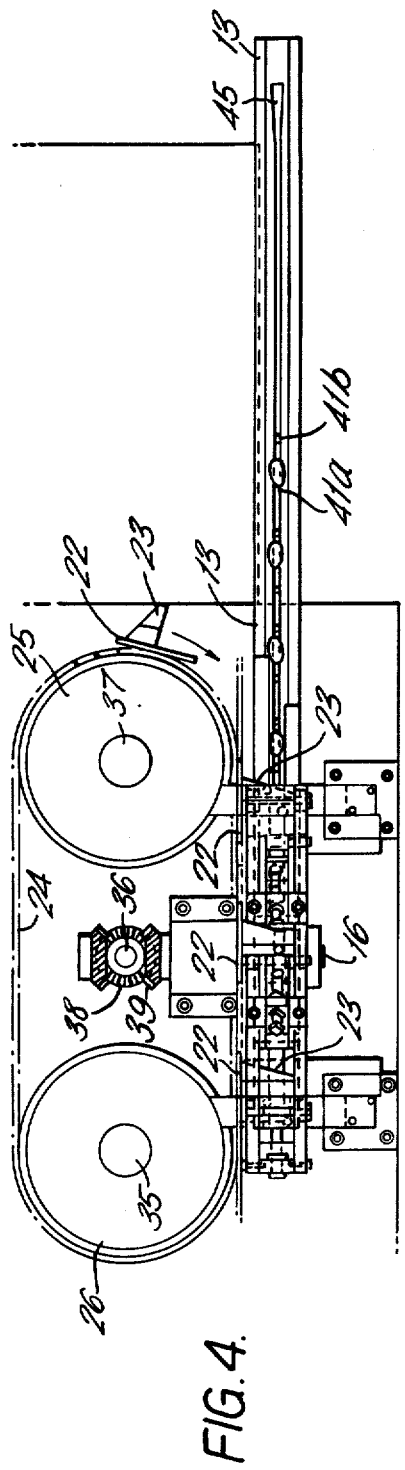
FIG. 4 is a plan view showing an embodiment of the cashew unshelling apparatus according to the invention.
Figure 5:
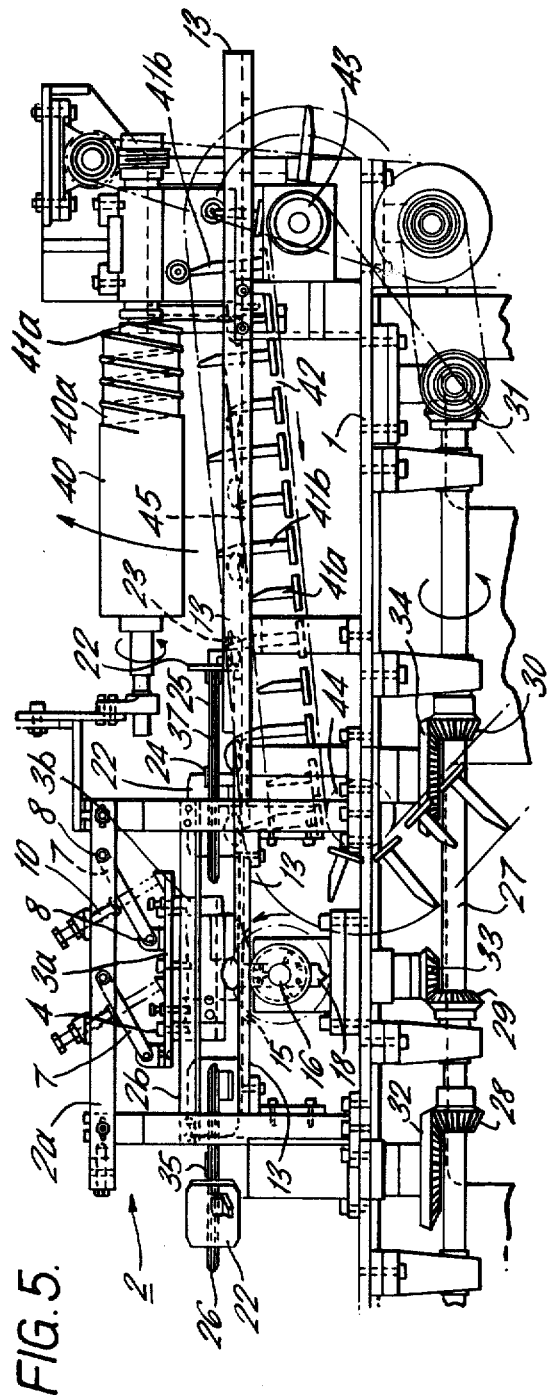
FIG. 5 is a side view of the apparatus shown in FIG. 4.
Figure 6:
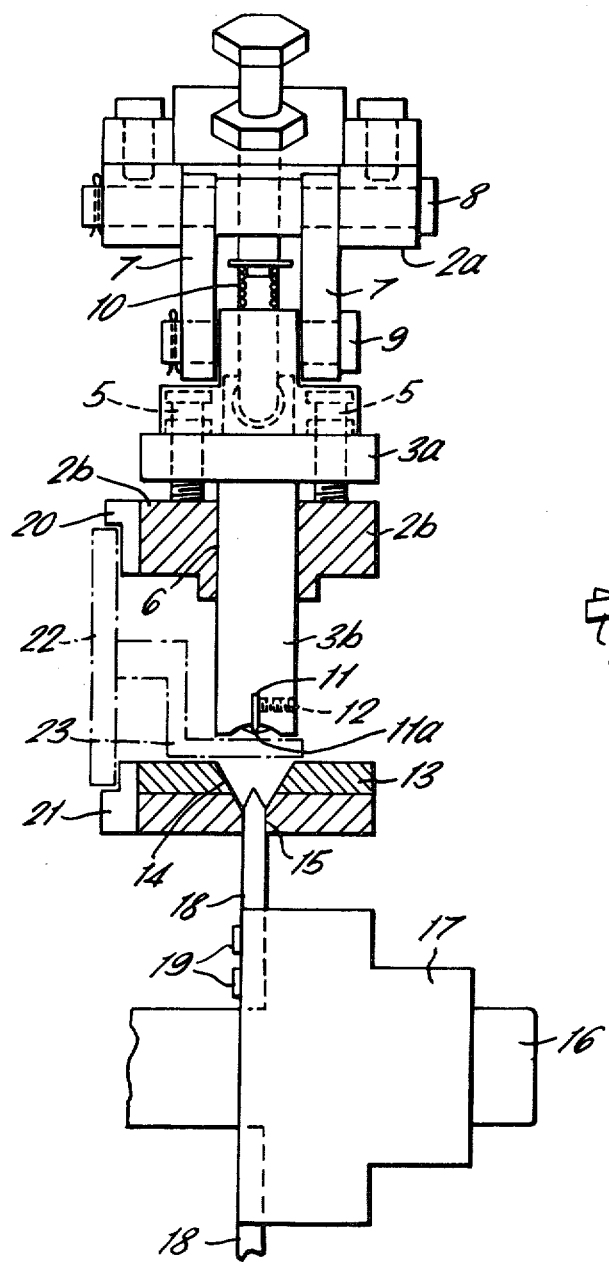
FIG. 6 is a vertical sectional front view of the apparatus shown in FIG. 4.
Figure 7:
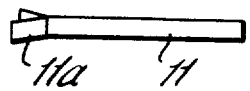
FIG. 7 is a perspective view of the upper cutting blade in the apparatus.
Figure 8:
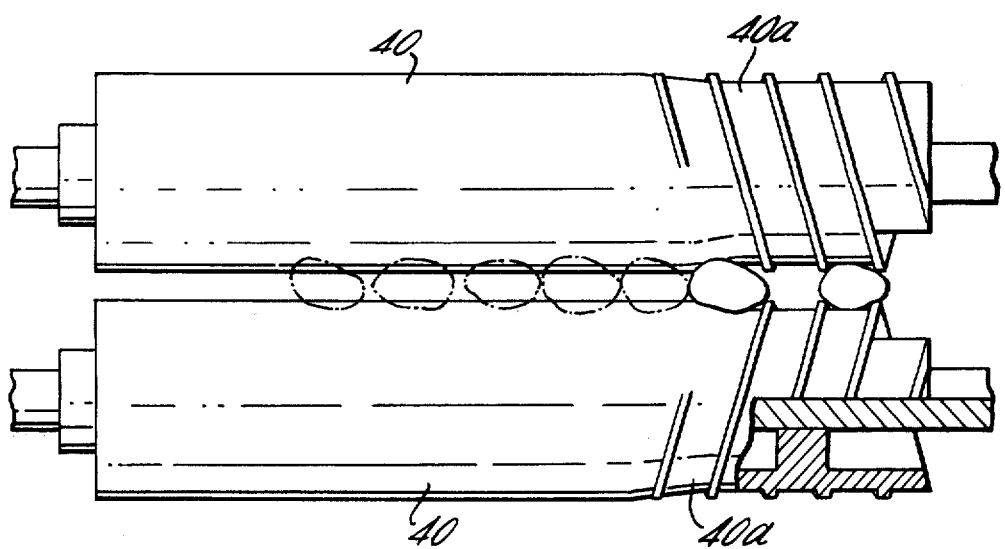
FIG. 8 is a plan view, partially in section, of the rollers used in the cashew position correcting and feeding apparatus which is used in combination with the apparatus of the invention.

The present invention will be described in further detail by way of the preferred embodiment shown in FIGS. 4 through 10 of the drawings. Referring to FIG. 5, reference numeral 1 generally designates a main frame structure for the apparatus of the invention and a position correcting and feeding apparatus to be described later. The apparatus of the invention is provided on the left side of the main frame structure 1 and the position correcting and feeding apparatus on the right side of the same. Reference numeral 2 generally designates an auxiliary frame structure provided on the left side of the main frame structure 1 and including an upper frame 2*a* and a lower frame 2*b*. The lower frame 2*b* consists of a pair of frame members arranged to form a space 6 therebetween, as shown in FIG. 6. An upper cutting blade supporting unit mounted on the frame structure 2 will be described hereunder with reference to FIGS. 5 – 7.

Figure 9:
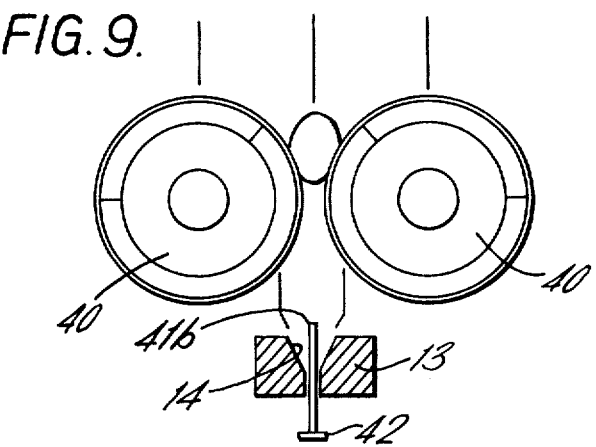
FIG. 9 is a front view of the rollers.
Figure 10:
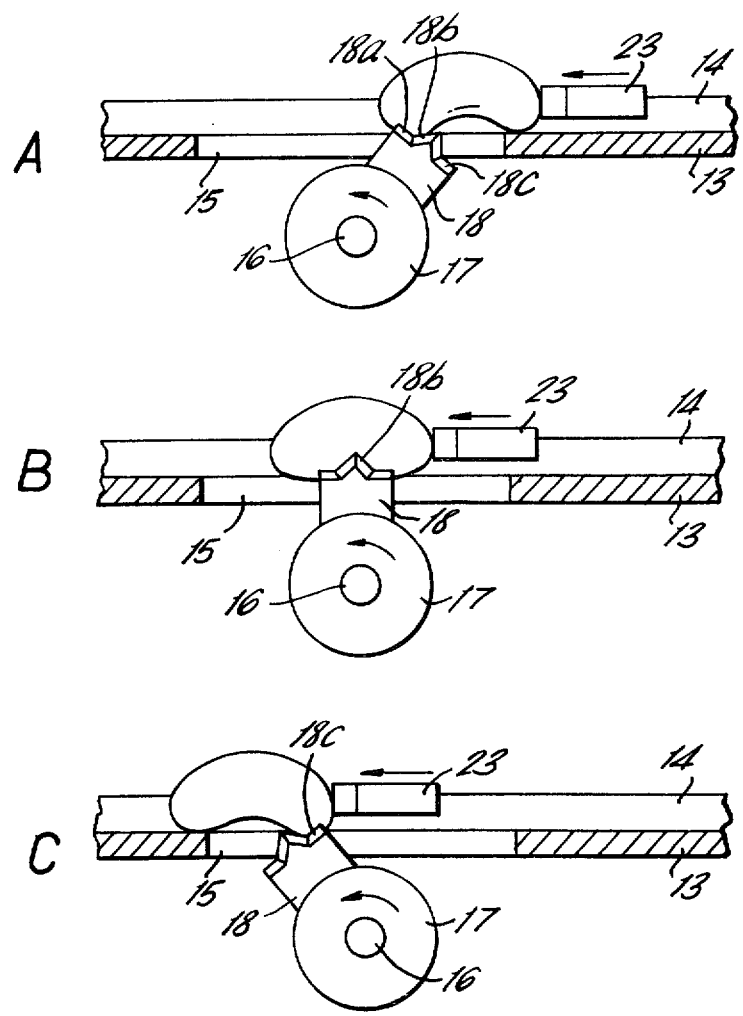
FIGS. 10(A) – 10(C) are diagrams illustrating the operation of the rotary lower cutting blade.

The supporting unit includes an upper supporting member 3*a* and a lower supporting member 3*b* fixed integrally with each other by means of bolts 4. Bolts 5 are threadably extended through the upper supporting member 3*a* for adjusting the height of the entire supporting unit. The lower supporting member 3*b* is extended loosely in the gap 6 formed between the lower frame members 2*b* for vertical movement therein but its downward movement from the position of FIGS. 5 and 6 is restrained by the bolts 5 abutting against the lower frame members 2*b*. Links 7 have upper ends connected with the upper supporting member 3*a* by pivot pins 8, with lower ends thereof connected with the supporting members 3*a*, 3*b* by pivot pins 9, to cause vertical movements of said supporting members 3*a*, 3*b*. Compressed springs 10 are interposed between the upper supporting member 3*a* and the upper frame 2*a* to hold the assembly of the upper and lower supporting members 3*a*, 3*b* and the adjusting bolts in pressure engagement with the lower frame member 2 *b*. Reference numeral 11 in FIG. 7 generally designates a Y-shaped upper cutting blade having a bifurcated end 11*a*. This cutting blade 11 is fixed to the lower supporting member 3*b* in such a position that the bifurcated end 11*a* extends to the left as viewed in FIG. 7, and is fixed to the lower supporting member by screws. Extending immediately below and parallel to the cutting blade 11 is a guide member 13. The guide member 13, as shown in FIG. 9, has a groove 14 of triangular cross section formed longitudinally in the upper surface thereof and a slit formed therein immediately below the cutting blade 11. In FIGS. 4, 5 and 6, reference numeral 16 designates a spindle extending immediately below the slit 15 at right angles to the guide member 13. A boss 17 is fixedly mounted on said spindle 16 and lower rotary cutting blades 18 are fixed to said boss 17 by screws 19. In the embodiment shown, the spindle 16 has two lower rotary cutting blades 18, and the length of each lower cutting blades is so determined that when the cutting blade is positioned vertically upwardly, its upper end projects above the triangular groove 14 through the slit 15. As shown in FIG. 6, the lower frame 2*b* and the guide member 13 respectively have aligned guide grooves 20, 21 on one side thereof for guiding slide members 22. Each slide member 22 has a pusher arm 23 extending over the guide member 13 for movement along and immediately above said guide member 13. A plurality of such slide members 22 are connected to a chain 24 in a manner shown in FIG. 4 with a large separation between adjacent slide members in the form of comb teeth. The chain 24 is engaged around two chain wheels 25, 26 to be driven thereby and carries the slide members 22 in the manner described. The chain and the chain wheels constitute a guide mechanism for advancing the pusher arms along the triangular grooves. A shaft 27 shown at the lower portion of FIG. 5 is a driving shaft driven by a drive source (not shown), and has four bevel gears 28–31 mounted thereon sequentially from the left. The rotation of the driving shaft 27 is transmitted to the chain wheels 26, 25 respectively from the bevel gears 28, 30 through intermeshing bevel gears 32, 34 and spindles 35, 37, and transmitted to the spindle 16 from the bevel gear 29 through an intermeshing bevel gear 33, and a spindle 36 and intermeshing bevel gears 38, 39 shown in FIG. 4. In the operation of the driving system described above, the chain wheels 25, 26 rotate, driving the chain 24 and thereby causing the pusher arms 23 of the slide members 22 carried by said chain to sweep above the guide member 13 one after another. Furthermore, the spindle 16 rotates, causing the lower rotary cutting blades 18 to protrude intermittently through the slit 15 formed in the guide member 13. The driving mechanism 27–39 is arranged such that the time when each pusher arm 23 reaches the slit 15 coincides with time when the lower rotary cutting blade 18 protrudes from the slit 15.

Figure 1A:
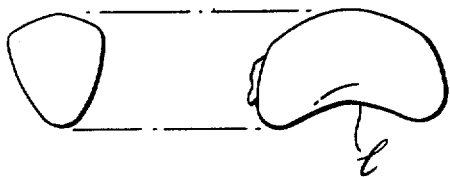
FIG. 1(A) is a set of a front view and a side view of cashew.
Figure 1B:
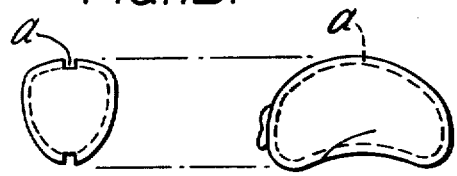
FIG. 1(B) is a set of a front view and a side view of the cashews having a groove formed in the shell thereof.

In order to achieve the unshelling operation smoothly by the unshelling apparatus described above, it is necessary to feed each of the cashews to said apparatus in the same position. An apparatus provided for this purpose is shown on the right hand side of FIG. 5, which corrects the position of each cashew in the manner described hereunder: Cashew has an anomelous shape as shown in FIG. 1(A). When the cashew is placed in the triangular groove 14 formed in the guide member 13 in an inverted position with respect to the position of FIG. 1(A) or with the convexed back side down, it contacts the surfaces of the triangular groove 14 at both sides of the convexed back at two points, so that the position of the cashew is very unstable and changes readily to the position of FIG. 1(A) when a push is given to the cashew in a horizontal direction parallel to the guide member 13. In the position shown in FIG. 1(A), the cashew contacts the surfaces of the triangular groove 14 at both sides of the concaved belly side or at four points and hardly changes to the back-side-up position when given a push in a horizontal direction. This means that when a push is given in a horizontal direction in each of cashews placed in the triangular groove 14, those in the convexed-back-side-down position are inverted to the concaved-belly-side-down position and those in the concaved-belly-side-down position remain in this position, and thus the positions of the cashews become uniform. The cashew position correcting apparatus comprises a pair of rollers 40 each having a spiral groove 40a and inclined downwardly rightwardly of FIG. 5, long and short pusher members 41a, 41b, a chain 42 and driving chain wheels 43, 44 for moving said pusher members slantingly downwardly toward the unshelling apparatus, and a pusher member guide slits 45 formed longitudinally through the guide member 13, said long and short pusher members 41a, 41b being moved by said chain 42 and driving chain wheels 43, 44 to pass a position immediately below the rightward ends of the rollers 40 one after another. The rollers 40 are driven such that the peripheral surfaces thereof move toward each other at the undersides thereof and cashews supplied to the leftward ends of the rollers are conveyed toward the rightward ends thereof while being arranged in one row by the cooperating spiral grooves of said rollers. At the rightward ends of the rollers, the cashews drop down one after another to the aforesaid position immediately below the rightward ends of the rollers, at a time immediately before each short pusher member 41a reaches said position. The cashews dropping from the rollers rest in the triangular groove 14 of the guide member 13 and are pushed by the moving short pusher members 41a respectively, so that those cashews in the convexed-back-side-down position are inverted to the convexed-back-side-up position shown in FIG. 1(A) and those in the convexed-back-side-up position remain in their position, and thereafter, the cashews are pushed toward the unshelling apparatus by the pusher members 41a. The pusher members 41a are gradually moved down as they move toward the unshelling apparatus and finally completely withdrawn from the guide member 13, leaving the cashews on said guide member which have previously been pushed by said pusher members 41a. However, each of the short pusher members 41a is followed by each longer pusher member 41b which has not been withdrawn from the guide member 13 because of its longer length. The cashews are again contacted by these longer pusher members 41b and thereby the position of those cashews which has not been corrected is corrected. The pusher members 41b are withdrawn from the guide member 13 at the entrance end of the unshelling apparatus or at a position near the chain wheel 25, and the cashews are left on the guide member. However, the aforesaid pusher arms 23 of the unshelling apparatus come to the withdrawn position immediately after the withdrawal of the pusher members 41b and the position-corrected cashews are pushed into the unshelling apparatus along the triangular groove 14 of the guide member 13 by said pusher arms respectively. The chain 43 and rollers 40, 40 are driven by the drive from the driving source transmitted thereto through the bevel gear 31 mentioned previously and a successive driving mechanism. The condition of dropping the cashew just when each short pusher member 41a arrives at the position immediately below the rightward ends of the rollers 40, 40 is achieved by the driving mechanism successive to the bevel gear 31, and the condition of locating the pusher arm 23 on the guide member 13 concurrently with the withdrawal of each longer pusher member 41b from said guide member is achieved by the driving mechanism successive to the bevel gear 31 and the driving mechanism successive to the bevel gears 32, 34.

Figure 1C:
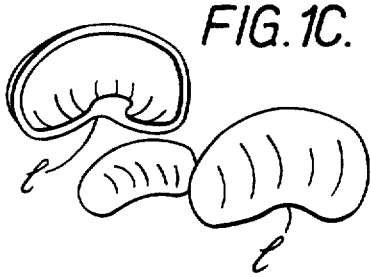
FIG. 1(C) is an exploded perspective view of the cashew after unshelling.
Figure 2:
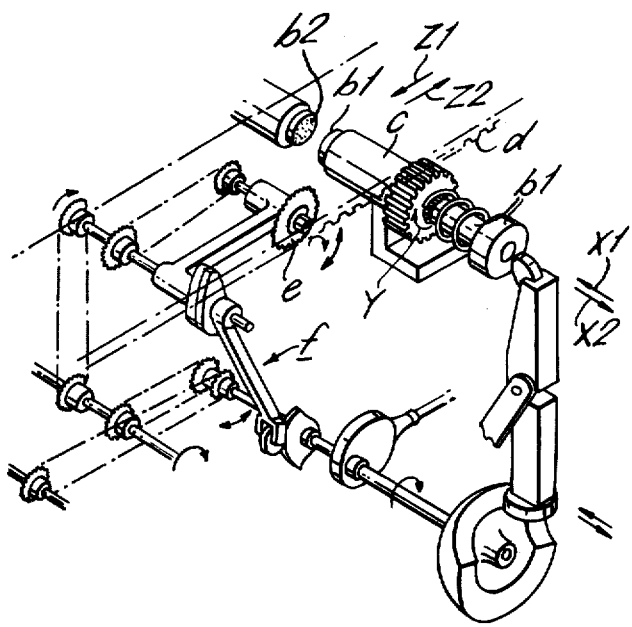
FIG. 2 is a perspective view showing a cut forming mechanism of a prior art unshelling apparatus.
Figure 3:
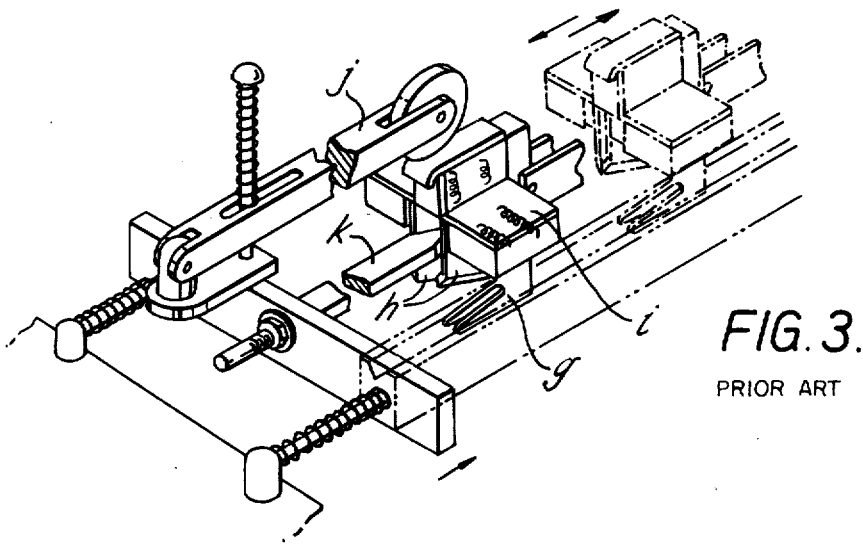
FIG. 3 is a perspective view showing an unshelling mechanism of the prior art apparatus shown.

Now, the operation of the unshelling apparatus described above will be explained: Cashews fed to the unshelling apparatus after their position has been corrected by the position correcting apparatus described above are carried one after another to the slit 15 and the upper and lower cutting blades 11, 18 on the guide member 13 by means of the pusher arms 23. The Y-shaped upper cutting blade 11 is connected to the lower face of the lower supporting member 3b above the triangular groove 14, and the cashew moving in the triangular groove is forced into contact with the cutting edge of said cutting blade, whereby a cut is formed in the round back of said cashew. In this case, the cashew moves the supporting members 3a, 3b slightly upwardly against the spring 10 so that the cut is formed positively under the weight of the supporting members 3a, 3b and the biasing force of the spring 10. The cashew is pushed continuously by the pushing arm 23 and, when it is located immediately above the slit 15, the lower rotary cutting blade 18 protrudes from said slit 15 pushing up the concaved portion of the cashew indicated by character *l* in FIGS. 1(A), 1(C) where the cashew shell is relatively hard and fragile and otherwise is difficult to cut, and thus a cut is formed also at this portion. The manner in which the cut is formed by the lower cutting blade is illustrated in FIGS. 10(A), 10(B) and 10(C). The lower rotary cutting blade 18 has a central cutting edge 18b and cutting edges 18a, 18c on both sides of said central cutting edge 18b, and forms the cut in successive stages. Namely, the cutting edge 18a first cuts the cashew shell as shown in FIG. 10(A), then the cutting edge 18b cuts the shell as shown in FIG. 10(B) and finally the cutting edge 18c cuts the shell as shown in FIG. 10(C). In this way, the cut is formed smoothly in the lower concaved portion of the shell, which otherwise would be difficult to form. During this cutting operation, the supporting members 3a, 3b and the spring 10 serve to depress the cashew, ensuring that the cut is formed positively, but the pushing arm 23 continuously pushes the cashew so that the cashew moves forward with the upper cutting edge penetrating the upper portion of the shell, whereby the cut is formed over the length of the upper portion of the shell. As the cashew is pushed by the pusher arm 23, the bifurcated rear end 11a of the Y-shaped upper cutting blade wedges into the cut thus formed in the upper portion of the cashew shell. Since the cashew is depressed by the supporting members 3a, 3b and the spring 10, and has the cut formed also in the lower portion of the shell thereof, the shell is divided into two halves along the upper and lower cuts, and the divided cashew shell and the cashew nut fall from the guide member 13 to be collected separately.

Although the present invention has been described and illustrated herein in terms of a specific embodiment, it is to be understood that the invention is not restricted to the above-detailed embodiment but many changes and modifications are possible within the scope of the invention.

We claim:

1. A cashew unshelling apparatus wherein the cashews are constantly moving during the unshelling operation, comprising:
   - a horizontal elongated guide member having a groove of triangular cross-sections formed longitudinally in the upper surface thereof and a slit formed at substantially the center of the length thereof along the bottom of said triangular groove;
   - upper and lower frames arranged vertically in two stages above said slit;
   - a cutting blade supporting means vertically movably mounted on and extending through said lower frame with the lower portion thereof suspended from said lower frame to a level immediately above said slit;
   - a spring interposed between the upper portion of said cutting blade supporting member and said upper frame for urging said supporting member downwardly; a spindle;
   - a noncontinuous lower rotary cutting blade connected to said spindle arranged immediately below said slit and extending at right angles to said guide member, the cutting edge of said lower rotary cutting blade moving into and out of said slit during rotation of said spindle;
   - a Y-shaped upper cutting blade connected to the lower end face of said supporting member in parallel to said guide member and with the Y-shaped bifurcated portion thereof extending downstream with respect to the moving direction of said cashews; a chain
   pushing members connected to said chain with a large separation between adjacent pushing members and carried thereby for feeding cashews to a position between said upper and lower cutting blades, said cashews being placed in said triangular groove with the convexed backs upside, said cashews being constantly moved by said pushing members during the unshelling operation;
   - driving chain wheels for driving said chain and coupled thereto, said chain and said driving chain wheels constituting a guide mechanism for advancing said pusher members along the triangular groove; and
   - means operatively coupled for synchronizing the time when each of said pusher members reaches said slit and the time when said lower rotary cutting blade protrudes from said slit.

* * * * *